United States Patent
Lee et al.

(10) Patent No.: US 12,382,446 B2
(45) Date of Patent: Aug. 5, 2025

(54) HARQ TRANSMISSION USING TIMERS FOR CONFIGURED GRANTS AND DISCONTINUOUS RECEPTION

(71) Applicant: LG Electronics Inc., Seoul (KR)

(72) Inventors: Youngdae Lee, Seoul (KR); Giwon Park, Seoul (KR); Seungmin Lee, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 17/802,032

(22) PCT Filed: Mar. 25, 2021

(86) PCT No.: PCT/KR2021/003692
§ 371 (c)(1),
(2) Date: Aug. 24, 2022

(87) PCT Pub. No.: WO2021/194271
PCT Pub. Date: Sep. 30, 2021

(65) Prior Publication Data
US 2023/0111565 A1    Apr. 13, 2023

Related U.S. Application Data

(60) Provisional application No. 63/000,480, filed on Mar. 26, 2020.

(51) Int. Cl.
*H04W 72/12* (2023.01)
*H04L 1/18* (2023.01)
(Continued)

(52) U.S. Cl.
CPC ........... *H04W 72/12* (2013.01); *H04L 1/1812* (2013.01); *H04L 1/188* (2013.01); *H04W 76/28* (2018.02)

(58) Field of Classification Search
None
See application file for complete search history.

(56) References Cited

U.S. PATENT DOCUMENTS

2019/0158229 A1   5/2019  Wei et al.
2020/0275474 A1*  8/2020  Chen .................... H04L 1/1848
(Continued)

OTHER PUBLICATIONS

LG Electronics Inc., "Introduction of 5G V2X with NR Sidelink," R2-2002342, 3GPP TSG-RAN WG2, Meeting #109-e, Online, Feb. 24-Mar. 6, 2020, 15 pages.
(Continued)

*Primary Examiner* — Scott M Sciacca
(74) *Attorney, Agent, or Firm* — Fish & Richardson P.C.

(57) ABSTRACT

A method and apparatus for hybrid automatic repeat request (HARQ) transmission using timers for configured grants and discontinuous reception (DRX) is provided. A first wireless device operating in a wireless communication system receives, from a second wireless device, a sidelink HARQ feedback for a media access control (MAC) protocol data unit (PDU) on a physical sidelink feedback channel (PSFCH), and starts a DRX HARQ round trip time (RTT) timer for a HARQ process ID after end of reception of the sidelink HARQ feedback. Upon expiry of the DRX HARQ RTT timer, the first wireless device starts a DRX retransmission timer, and monitors a physical downlink control channel (PDCCH) carrying a sidelink retransmission grant during an active time including a time interval for which the DRX retransmission timer is running.

9 Claims, 11 Drawing Sheets

(51) Int. Cl.
  *H04L 1/1812* (2023.01)
  *H04L 1/1867* (2023.01)
  *H04W 76/28* (2018.01)

(56) References Cited

U.S. PATENT DOCUMENTS

2020/0304969 A1* 9/2020 Basu Mallick ....... H04W 72/23
2022/0322421 A1* 10/2022 Zhao ..................... H04L 1/1822

OTHER PUBLICATIONS

Notice of Allowance in Korean Appln. No. 10-2022-7036688, mailed on Jun. 12, 2024, 5 pages (with English translation).
3GPP TR 38.885 V16.0.0 (Mar. 2019), "3rd Generation Partnership Project; Technical Specification Group Radio Access Network; NR; Study on NR Vehicle-to-Everything (V2X) (Release 16)," Mar. 2019, 122 pages.
CATT, "Correction on the drx-HARQ-RTT-TimerDL," 3GPP TSG-RAN WG2 Meeting#109 electronic, R2-2000121, Elbonia, Feb. 24-Mar. 6, 2020, 4 pages.
Ericsson, "Support of HARQ procedure over sidelink," 3GPP TSG-RAN WG2 #107bis, R2-1913327, Chongqing, China, Oct. 14-18, 2019, 10 pages.
Lenovo et al., "Remaining aspects of SL HARQ protocol operation," 3GPP TSG RAN WG2 Meeting #109e, R2-2000823, Feb. 24-ar. 6, 2020, 4 pages.
LG Electronics Inc., "[Running CR] Introduction of 5G V2X with NR Sidelink," 3GPP TSG-RAN WG2 Meeting #109-e, R2-2000235, Online, Feb. 24-Mar. 6, 2020, 37 pages.
Huawei, HiSilicon, "Discussion on HARQ support for NR sidelink," 3GPP TSG-RAN WG2 #107bis, R2-1913701, Chongqing, China, Oct. 14-18, 2019, 17 pages.
Office Action in Korean Appln. No. 10-2022-7036688, mailed on Oct. 28, 2023, 12 pages (with English translation).

* cited by examiner

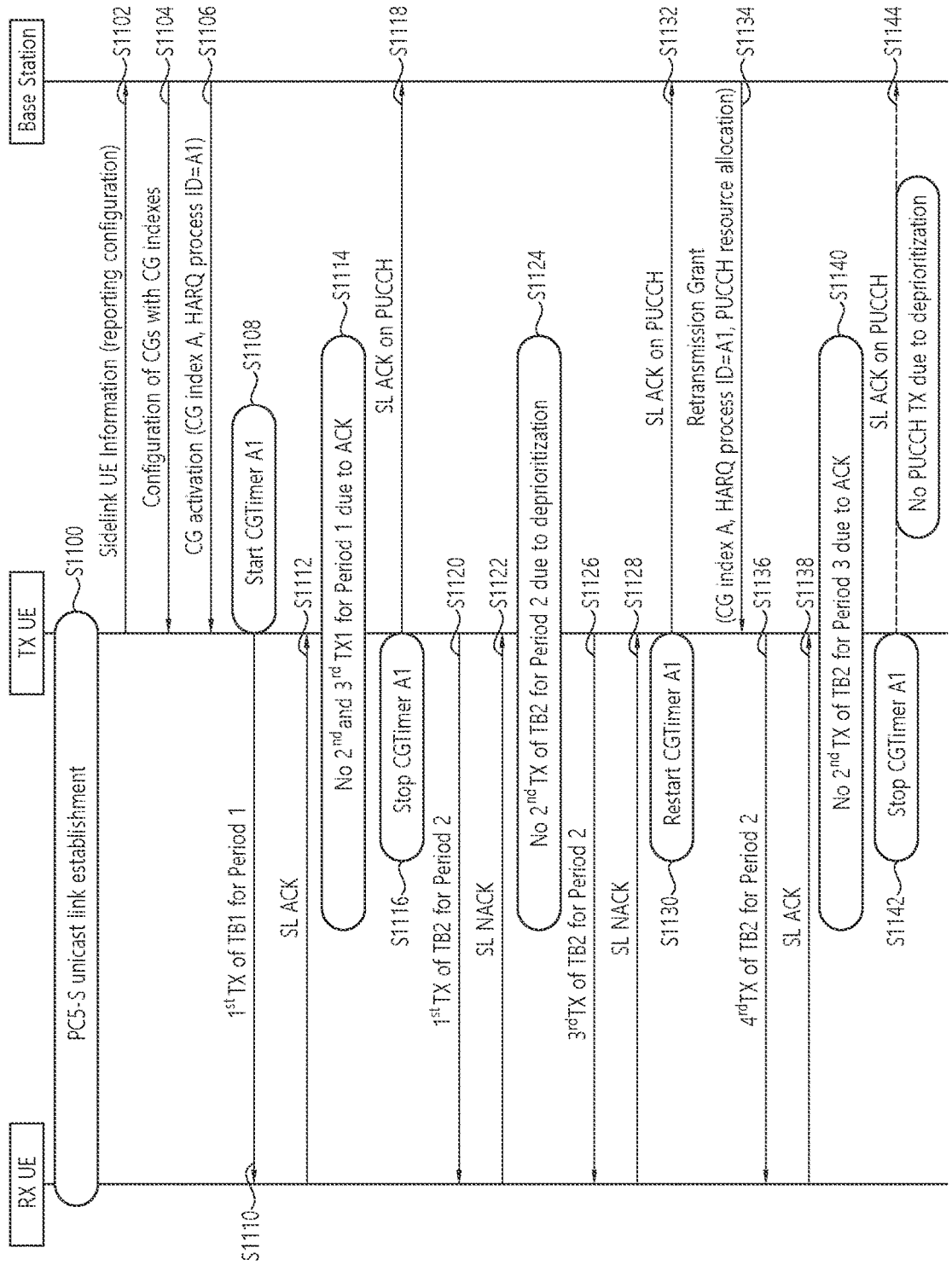

HARQ TRANSMISSION USING TIMERS FOR CONFIGURED GRANTS AND DISCONTINUOUS RECEPTION

CROSS-REFERENCE TO RELATED APPLICATIONS

This application is a National Stage application under 35 U.S.C. § 371 of International Application No. PCT/KR2021/003692, filed on Mar. 25, 2021, which claims the benefit of U.S. Provisional Application No. 63/000,480, filed on Mar. 26, 2020. The disclosures of the prior applications are hereby incorporated by reference herein in their entirety.

TECHNICAL FIELD

The present disclosure relates to hybrid automatic repeat request (HARQ) transmission using timers for configured grants and discontinuous reception (DRX).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

An aspect of the present disclosure is to provide a method and apparatus for performing hybrid automatic repeat request (HARQ) transmission using timers for configured grants.

Another aspect of the present disclosure is to provide a method and apparatus for monitoring a physical downlink control channel (PDCCH) carrying a sidelink (SL) grant during an active time considering a sidelink HARQ feedback.

In an aspect, a method performed by a first wireless device operating in a wireless communication system is provided. The method includes starting a discontinuous (DRX) hybrid automatic repeat request (HARQ) round trip time (RTT) timer for a HARQ process ID after end of reception of a sidelink HARQ feedback for a media access control (MAC) protocol data unit (PDU), starting a DRX retransmission timer upon expiry of the DRX HARQ RTT timer, and monitoring a physical downlink control channel (PDCCH) carrying a SL retransmission grant during an active time including a time interval for which the DRX retransmission timer is running.

In another aspect, a method performed by a network node operating in a wireless communication system is provided. The method includes transmitting, to a wireless device, a SL retransmission grant during an active time including a time interval for which a discontinuous reception (DRX) retransmission timer is running. The DRX retransmission timer starts upon expiry of a DRX hybrid automatic repeat request (HARQ) round trip time (RTT) timer for a HARQ process ID, and the DRX HARQ RTT timer for the HARQ process ID starts after end of reception, by the wireless device, of sidelink HARQ feedback for transmission of a media access control (MAC) protocol data unit (PDU).

In another aspect, apparatuses for implementing the above methods are provided.

The present disclosure can have various advantageous effects.

For example, the start point of the active time for PDCCH monitoring carrying SL grant can be optimized.

For example, ambiguity can be eliminated because active time is defined based on PSFCH reception regardless of the presence of PUCCH resources.

For example, a UE performing HARQ transmissions of a configured grant can properly handle a timer for new transmission and/or retransmission of a configured grant, in particular when the UE performs new transmission or retransmission on the configured grant based on the timer.

For example, the system can properly control new transmission or retransmission of a configured grant for a UE performing HARQ transmissions on the configured grant.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 11 shows an example of sidelink transmission using sidelink configured grants to which implementation 2 of the present disclosure is applied.

DETAILED DESCRIPTION

Figure 1:
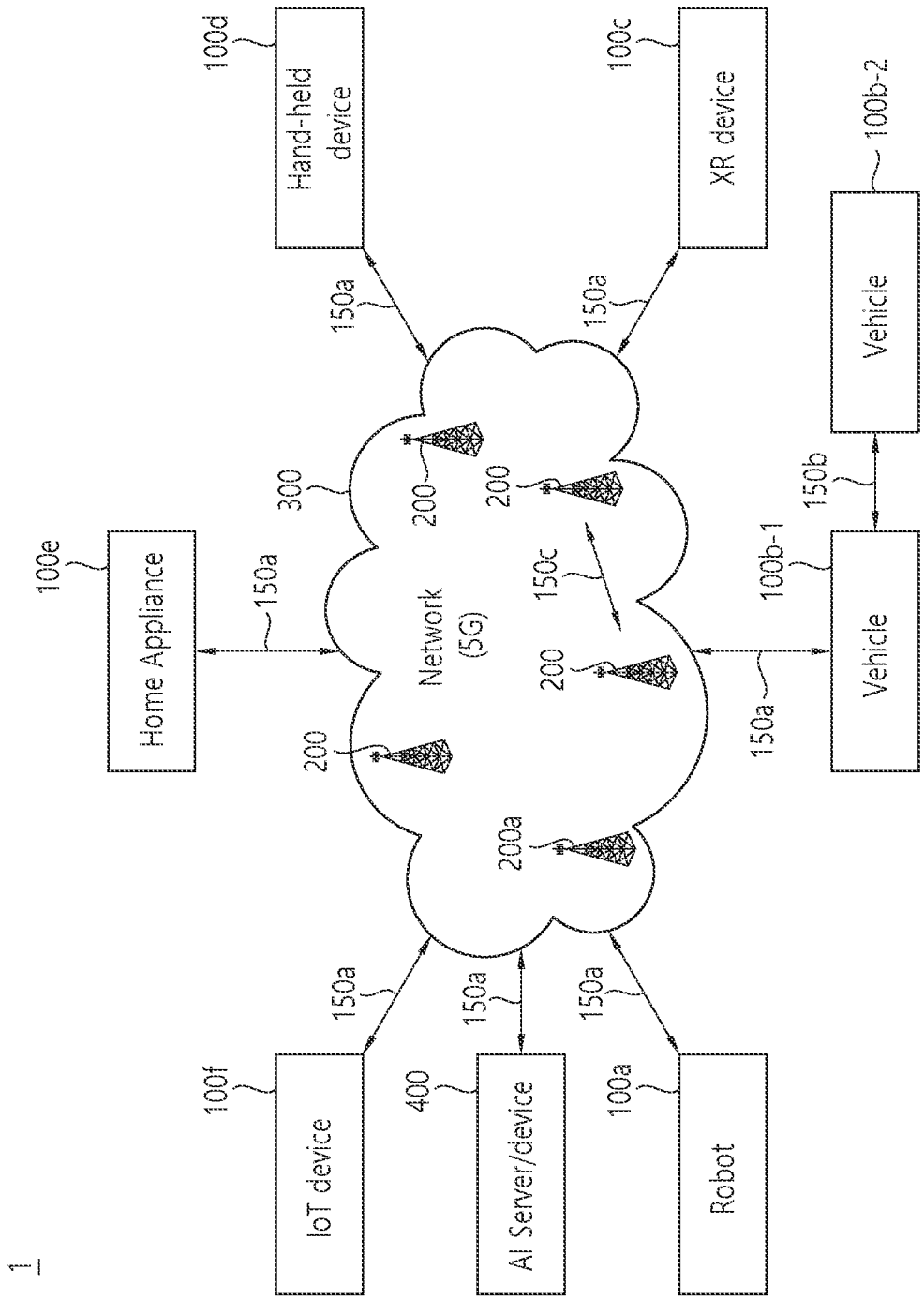
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure. "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*. 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
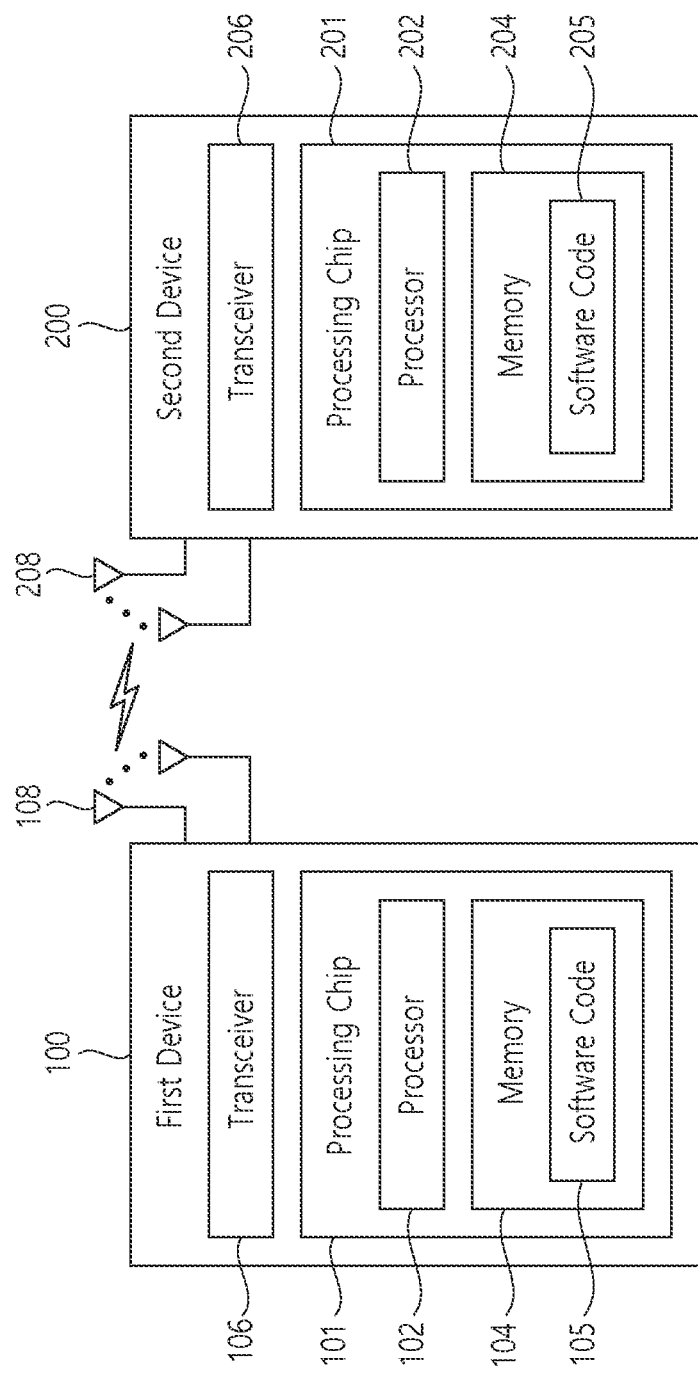
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
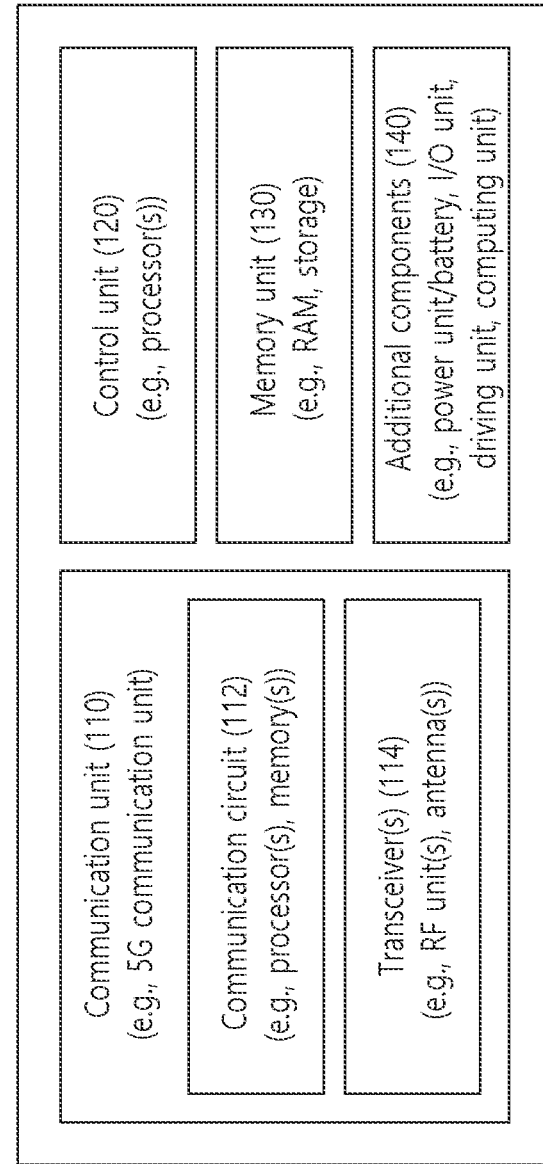
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
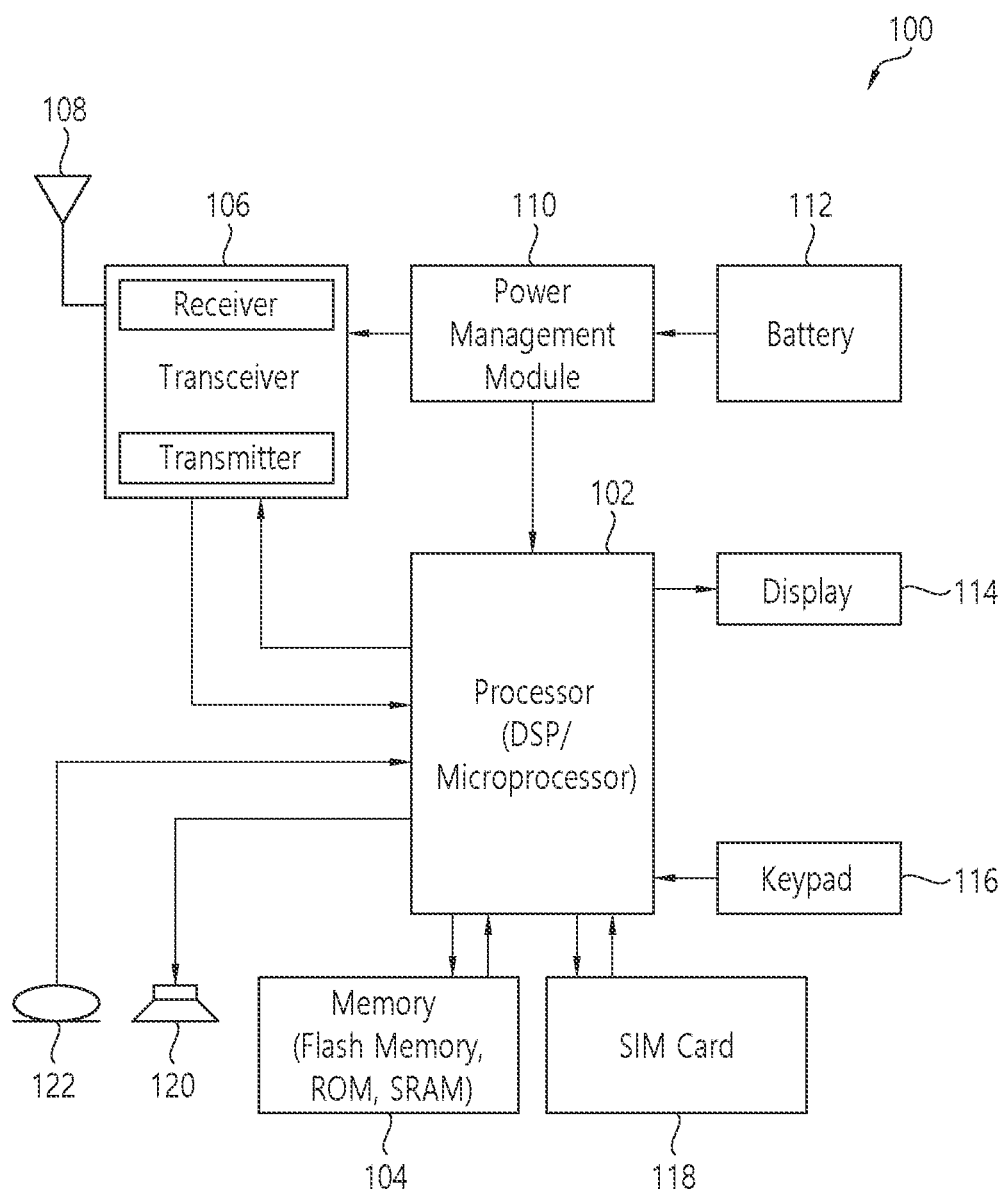
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®. A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
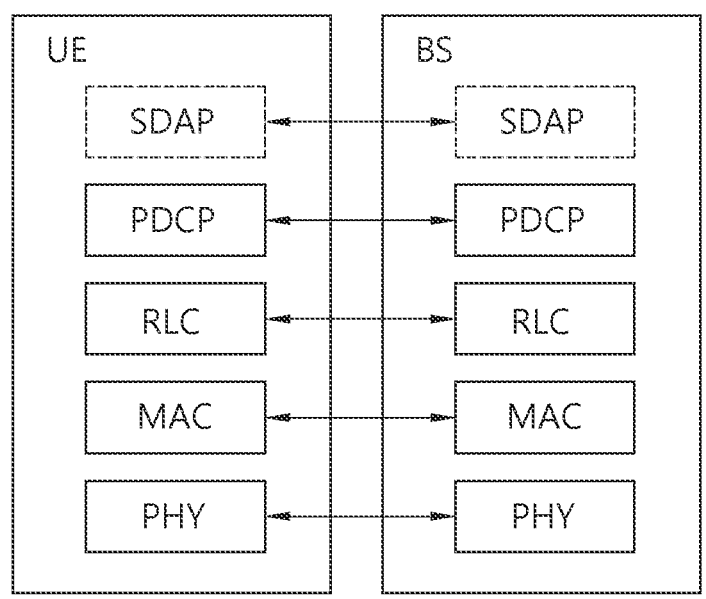
FIGS. 5 and 6 show an example of protocol stacks in a 3GPP based wireless communication system to which implementations of the present disclosure is applied.
Figure 6:
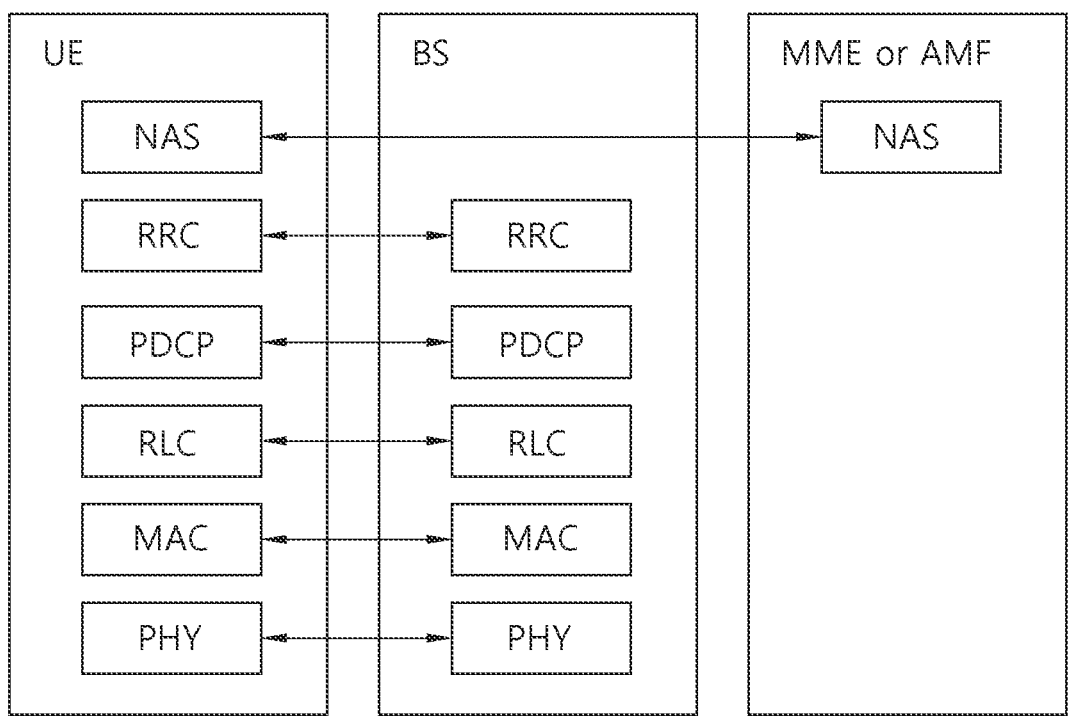

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC. RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
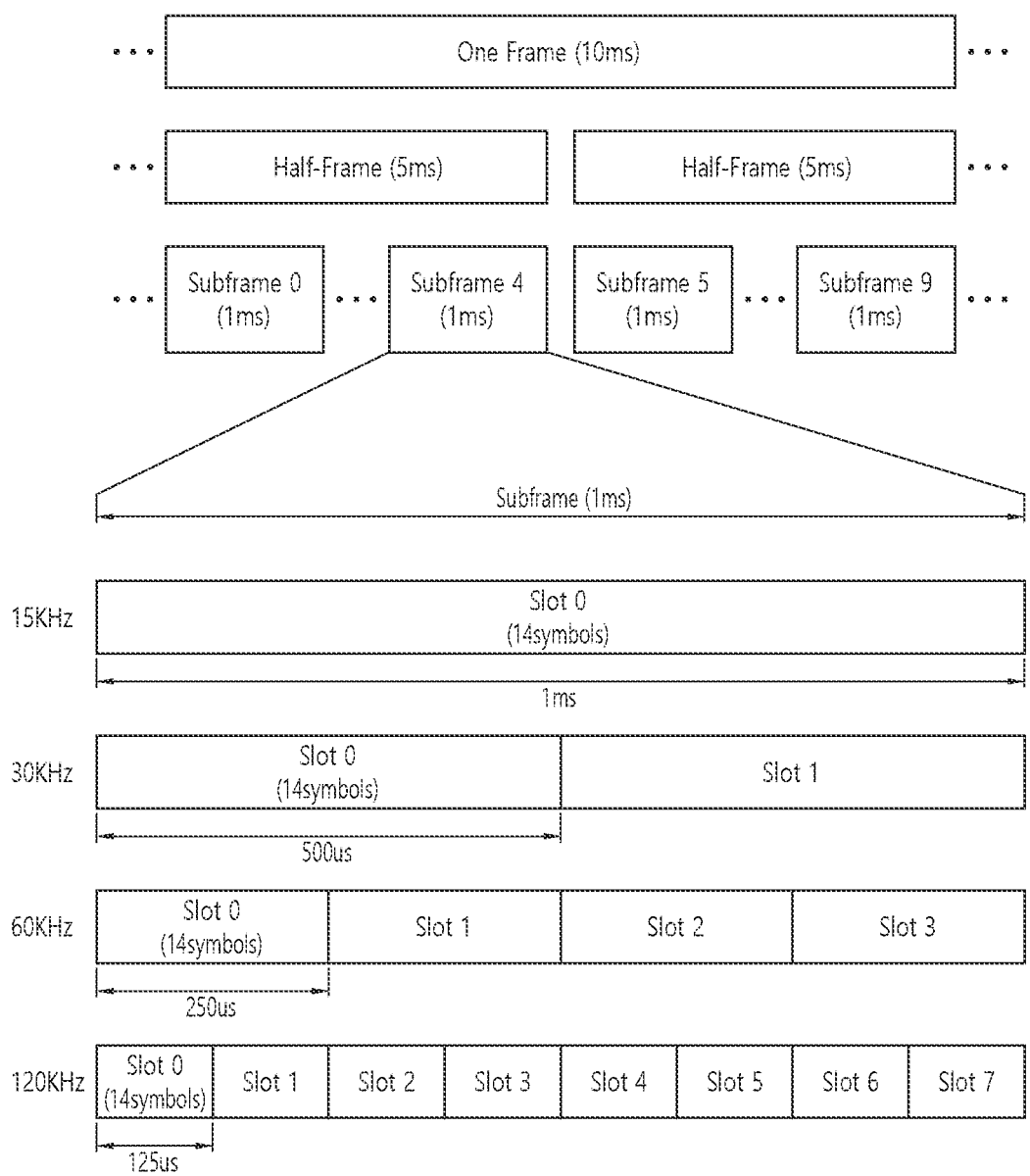
FIG. 7 shows a frame structure in a 3GPP based wireless communication system to which implementations of the present disclosure is applied.

FIG. 7 shows a frame structure in a 3GPP based wireless communication system to which implementations of the present disclosure is applied.

The frame structure shown in FIG. 7 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^{u} * 15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^{u} * 15$ kHz.

TABLE 3

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^{u} * 15$ kHz.

TABLE 4

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 8:
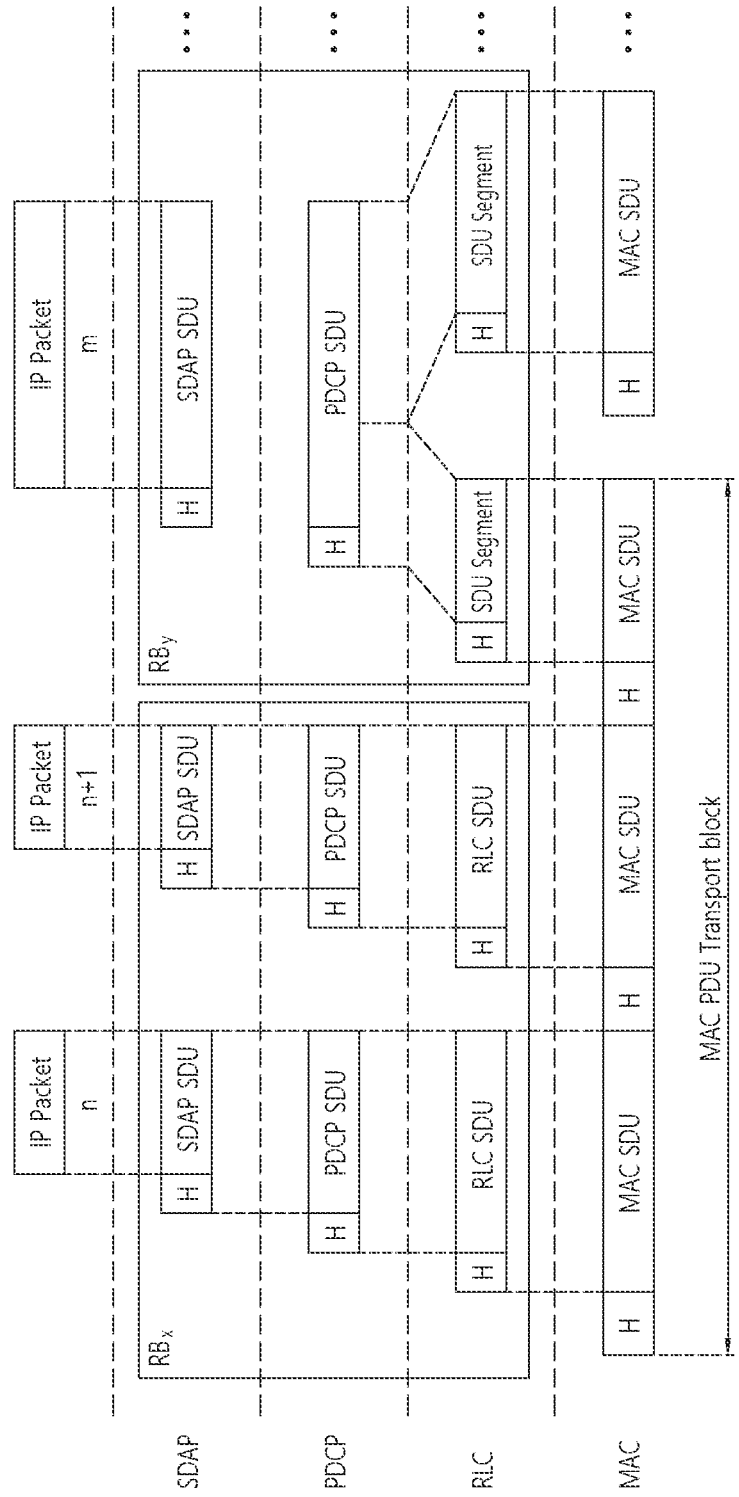
FIG. 8 shows a data flow example in the 3GPP NR system to which implementations of the present disclosure is applied.

FIG. 8 shows a data flow example in the 3GPP NR system to which implementations of the present disclosure is applied.

Referring to FIG. 8, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Sidelink (SL) resource allocation in 5G NR is described. Section 5.3 of 3GPP TS 38.885 V16.0.0 can be referred.

At least the following two SL resource allocation modes may be defined.

Mode 1: BS schedules SL resource(s) to be used by UE for SL transmission(s).

Mode 2: UE determines, i.e. BS does not schedule, SL transmission resource(s) within SL resources configured by BS/network or pre-configured SL resources.

The definition of SL resource allocation Mode 2 covers:
a) UE autonomously selects SL resource for transmission
b) UE assists SL resource selection for other UE(s), a functionality which can be part of a), c), d)
c) UE is configured with NR configured grant (Type-1 like) for SL transmission
d) UE schedules SL transmissions of other UEs Resource allocation mode 2 supports reservation of SL resources at least for blind retransmission.

Sensing- and resource (re-)selection-related procedures are supported for resource allocation mode 2.

The sensing procedure considered is defined as decoding sidelink control information (SCI(s)) from other UEs and/or SL measurements. Decoding SCI(s) in this procedure provides at least information on SL resources indicated by the UE transmitting the SCI. The sensing procedure uses a L1 SL reference signal received power (RSRP) measurement based on SL demodulation reference signal (DMRS) when the corresponding SCI is decoded.

The resource (re-)selection procedure considered uses the results of the sensing procedure to determine resource(s) for SL transmission.

For mode 2(a), SL sensing and resource selection procedures may be considered in the context of a semi-persistent scheme where resource(s) are selected for multiple transmissions of different transport blocks (TBs) and a dynamic scheme where resource(s) are selected for each TB transmission.

The following techniques are studied to identify occupied SL resources:
Decoding of SL control channel transmissions
SL measurements
Detection of SL transmissions The following aspects are studied for SL resource selection
How a UE selects resource for physical sidelink control channel (PSCCH) and physical sidelink shared channel (PSSCH) transmission (and other SL physical channel/signals that are defined)
Which information is used by UE for resource selection procedure For out-of-coverage operation, mode 2(c) assumes a (pre-)configuration of single or multiple SL transmission patterns, defined on each SL resource pool. For in-coverage operation, mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For mode 2(d), in the context of group-based SL communication, it supported for UE-A to inform its serving gNB about members UE-B, UE-C, and so on of a group, and for the gNB to provide individual resource pool configurations and/or individual resource configurations to each group member through UE-A. UE-A cannot modify the configurations, and there is no direct connection required between any member UE and the gNB. Higher-layer only signaling is used to provide the configurations. Such functionality is up to UE capability(ies).

Sidelink resource allocation is described in detail. If the TX UE is in RRC_CONNECTED and configured for gNB scheduled sidelink resource allocation (e.g., mode 1), the TX UE may transmit sidelink UE information including traffic pattern of Service, TX carriers and/or RX carriers mapped to service, QoS information related to service (e.g. 5QI, ProSe-per-packet priority (PPPP), ProSe-per-packet reliability (PPPR). QoS class identifier (QCI) value), and destination related to service.

After receiving the sidelink UE information, the gNB constructs sidelink configuration at least including one or more resource pools for service and sidelink buffer status reporting (BSR) configuration. The gNB signals the sidelink configuration to the TX UE and then the TX UE configures lower layers with sidelink configuration.

If a message becomes available in L2 buffer for sidelink transmission, the TX UE triggers scheduling request (SR), so that the TX UE transmits PUCCH resource. If PUCCH resource is not configured, the TX UE performs random access procedure as the SR. If an uplink grant is given at a result of the SR, the TX UE transmits sidelink BSR to the gNB. The sidelink BSR indicates at least a destination index, a logical channel group (LCG), and a buffer size corresponding to the destination.

After receiving the sidelink BSR, the gNB transmits a sidelink grant to the TX UE, e.g., by sending downlink control information (DCI) in PDCCH. The DCI may include an allocated sidelink resource. If the TX UE receives the DCI, the TX UE uses the sidelink grant for transmission to the RX UE.

Alternatively, if the TX UE is configured for UE autonomous scheduling of sidelink resource allocation (e.g., mode 2) regardless of RRC state, the TX UE autonomously select or reselect sidelink resources to create a sidelink grant used for transmission to the RX UE.

1. Implementation 1

In conventional sidelink (e.g., V2X) communication in LTE-A, a UE operating in sidelink resource allocation mode 1 (i.e., network scheduled resource allocation) monitors PDCCH carrying SL grant during Uu's discontinuous reception (DRX) active time. However, in the conventional scheme, there have been problems where the timing of SL transmission between TX/RX UEs and the timing of allocating SL grant by the base station have not been optimized and/or aligned. Furthermore, for sidelink (e.g., V2X) communication in 5G NR, a DRX active time may need to be defined considering sidelink HARQ feedback.

According to implementation 1 of the present disclosure, a DRX HARQ round trip time (RTT) timer for a HARQ process ID may start after end of SL feedback channel reception. Upon expiry of the DRX HARQ RTT Timer, the DRX retransmission timer may start. The active time for PDCCH monitoring may include the time interval for which the DRX retransmission timer is running. A UE may perform SL retransmission upon receiving SL grant for retransmission of the MAC PDU during the active time.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
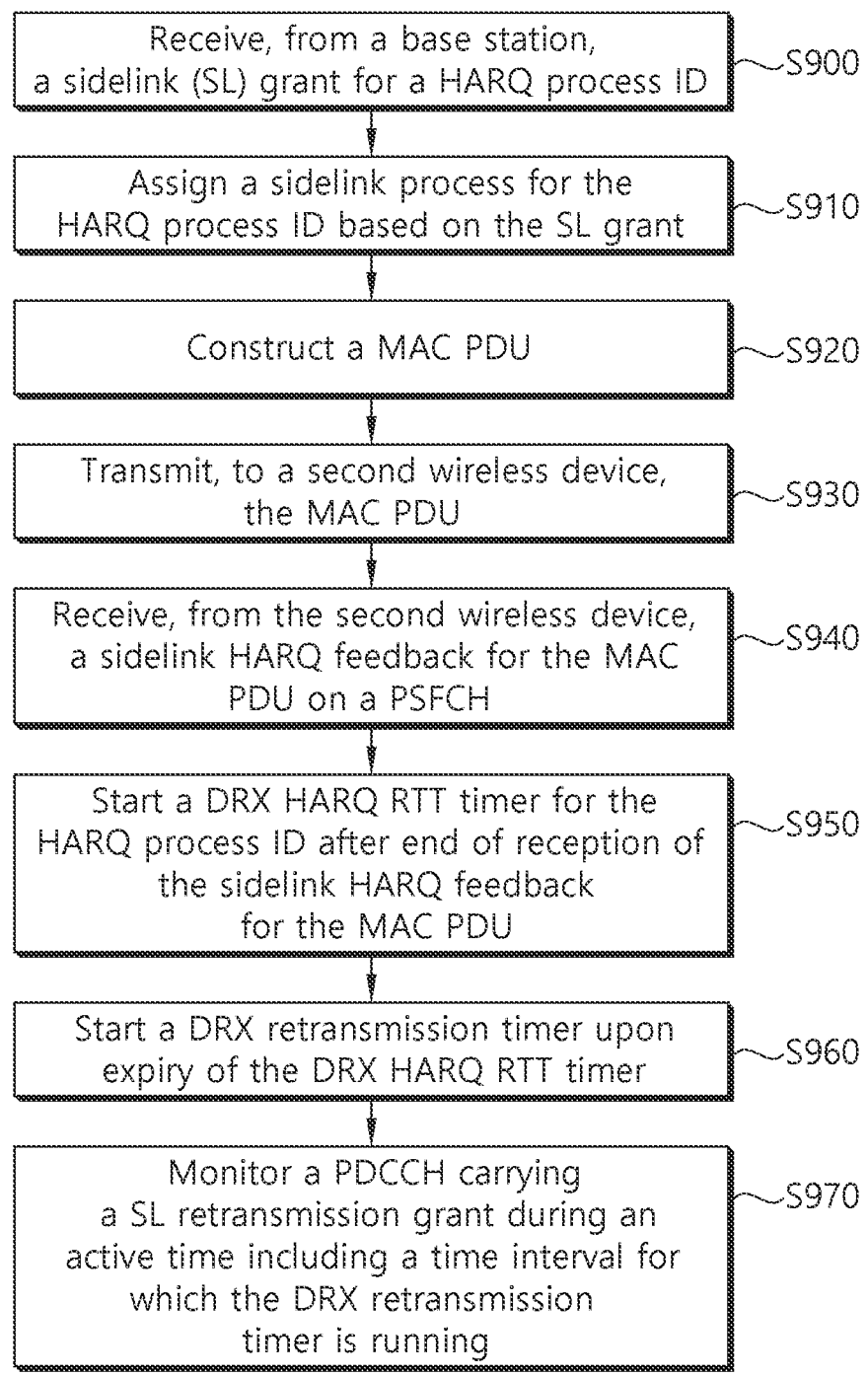
FIG. 9 shows an example of a method performed by a first wireless device to which implementation 1 of the present disclosure is applied.

FIG. 9 shows an example of a method performed by a first wireless device to which implementation 1 of the present disclosure is applied.

In step S900, the first wireless device receives, from a base station, a SL grant for a HARQ process ID.

In step S910, the first wireless device assigns a sidelink process for the HARQ process ID based on the SL grant.

In step S920, the first wireless device constructs a MAC PDU.

In step S930, the first wireless device transmits, to a second wireless device, the MAC PDU.

In some implementation, the MAC PDU may be transmitted in a configured sidelink grant.

In step S940, the first wireless device receives, from the second wireless device, a sidelink HARQ feedback for the MAC PDU on a PSFCH.

In some implementations, the sidelink HARQ feedback may correspond to a negative acknowledgement (NACK) for the MAC PDU.

In step S950, the first wireless device starts a DRX HARQ RTT timer for the HARQ process ID after end of reception of the sidelink HARQ feedback for the MAC PDU.

In some implementations, the DRX HARQ RTT timer may inform a minimum duration before the SL retransmission grant is expected by an MAC entity for a SL transmission with the reception of the sidelink HARQ feedback on the PSFCH.

In step S960, the first wireless devices starts a DRX retransmission timer upon expiry of the DRX HARQ RTT timer.

In some implementations, the DRX retransmission timer may inform a maximum duration until the SL retransmission grant is received.

In some implementations, the DRX retransmission timer may start based on no sidelink grant being available for retransmission of the MAC PDU and the maximum number of HARQ retransmissions of the MAC PDU not being reached.

In step S970, the first wireless device monitors a PDCCH carrying a SL retransmission grant during an active time including a time interval for which the DRX retransmission timer is running.

In some implementations, the first wireless device may perform retransmission of the MAC PDU based on the SL retransmission grant.

In some implementations, a second sidelink HARQ feedback on a PUCCH to the base station may be enabled or disabled.

In some implementations, the first wireless device may be in communication with at least one of a mobile device, a network, and/or autonomous vehicles other than the first wireless device.

According to implementation 1 of the present disclosure shown in FIG. 9, an example of operations of the MAC entity may be as follows.

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, TPC-SRS-RNTI, SL-RNTI and SLCS-RNTI. When using DRX operation, the MAC entity shall also monitor PDCCH according to requirements found in other clauses. When in RRC_CONNECTED, if DRX is configured, for all the activated Serving Cells, the MAC entity may monitor the PDCCH discontinuously using the DRX operation.

RRC controls DRX operation by configuring the following parameters:

drx-onDurationTimer: the duration at the beginning of a DRX Cycle;

drx-SlotOfset the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-RetransnissionTimerSL (per SL HARQ process ID or per SL configured grant): the maximum duration until a grant for SL retransmission is received;

drx-LongCycleStartOffset: the Long DRX cycle and drx-StartOffset which defines the subframe where the Long and Short DRX Cycle starts;

drx-ShorCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

drx-HARQ-RTT-TimerSL-PSFCH-PUCCH (per SL HARQ process ID or per SL configured grant): the minimum duration before a SL HARQ retransmission grant is expected by the MAC entity for a SL transmission with sidelink HARQ feedback reception on PSFCH and sidelink HARQ feedback transmission on PUCCH.

drx-HARQ-RTT-TimerSL-PSFCH (per SL HARQ process ID or per SL configured grant): the minimum duration before a SL HARQ retransmission grant is expected by the MAC entity for a SL transmission with sidelink HARQ feedback reception on PSFCH but without sidelink HARQ feedback transmission on PUCCH.

drx-HARQ-RTT-TimerSL-PUCCH (per SL HARQ process ID or per SL configured grant): the minimum duration before a SL HARQ retransmission grant is expected by the MAC entity for a SL transmission without sidelink HARQ feedback reception on PSFCH but with sidelink HARQ feedback transmission on PUCCH.

drx-HARQ-RTT-TimerSL (per SL HARQ process ID or per SL configured grant): the minimum duration before a SL HARQ retransmission grant is expected by the MAC entity for a SL transmission without sidelink HARQ feedback reception on PSFCH and sidelink HARQ feedback transmission on PUCCH.

When a DRX cycle is configured, the Active Time includes the time while:

drx-onDurationTimer or drx-InactivityTimer or drx-RetransmissionTimerDL or drx-RetransmissionTimerUL or drx-RetransmissionTimerSL or ra-ContentionResolutionDTmer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant:
2> start the drx-HARQ-RTT-TimerUL for the corresponding HARQ process in the first symbol after the end of the first repetition of the corresponding PUSCH transmission;
2> stop the drx-Retransmission TimerUL for the corresponding HARQ process.

In the present disclosure, the configured sidelink grant corresponds to one of a set of sidelink grants allocated by Configured Grant Type 1 or Configured Grant Type 2 in Sidelink Mode 1 or by TX resource (re-)selection in Sidelink Mode 2.
1> if a MAC PDU is transmitted in a configured sidelink grant and both sidelink HARQ feedback on PSFCH and sidelink HARQ feedback on PUCCH are enabled:
2> start the drx-HARQ-RTT-TimerSL-PSFCH-PUCCH for the corresponding HARQ process ID or the corresponding value of sl-ConfigIndexCG in the first symbol after the end of the corresponding PUCCH transmission carrying the SL HARQ feedback to the MAC PDU;
2> stop the drx-RetransmissionTimerSL for the corresponding HARQ process or the corresponding value of sl-ConfigIndexCG.
1> if a MAC PDU is transmitted in a configured sidelink grant and sidelink HARQ feedback on PSFCH is enabled but sidelink HARQ feedback on PUCCH are disabled:
2> start the drx-HARQ-RTT-TimerSL-PSFCH for the corresponding HARQ process ID or the corresponding value of sl-ConfigIndexCG in the first symbol after the end of the corresponding PSFCH reception carrying the SL HARQ feedback to the MAC PDU;
2> stop the drx-RetransmissionTimerSL for the corresponding HARQ process or the corresponding value of sl-ConfigIndexCG.
2> if a MAC PDU is transmitted in a configured sidelink grant and sidelink HARQ feedback on PSFCH is disabled but sidelink HARQ feedback on PUCCH are enabled:
1> start the drx-HARQ-RTT-TimerSL-PUCCH for the corresponding HARQ process ID or the corresponding value of sl-ConfigIndexCG in the first symbol after the end of the corresponding PUCCH transmission carrying the SL HARQ feedback to the MAC PDU;
2> stop the drx-RetransmissionTimerSL for the corresponding HARQ process or the corresponding value of sl-ConfigIndexCG.
1> if a MAC PDU is transmitted in a configured sidelink grant and both sidelink HARQ feedback on PSFCH and sidelink HARQ feedback on PUCCH are disabled:
2> start the drx-HARQ-RTT-TimerSL for the corresponding HARQ process ID or the corresponding value of sl-ConfigIndexCG in the first symbol after the end of the first repetition of the corresponding PSSCH transmission;
2> stop the drx-RetransmissionTimerSL for the corresponding HARQ process or the corresponding value of sl-ConfigIndexCG.
1> if a drx-HARQ-RTT-TimerDL expires:
2> if the data of the corresponding HARQ process was not successfully decoded:
3> start the drx-RetransmissionTimerDL for the corresponding HARQ process in the first symbol after the expiry of drx-HARQ-RTT-TimerDL.
1> if a drx-HARQ-RTT-Timer UL expires:
2> start the drx-RetransmissionTimerUL for the corresponding HARQ process in the first symbol after the expiry of drx-HARQ-RTT-TimerUL.
1> if a drx-HARQ-RT T-TimerSL-PSFCH-PUCCH or drx-HARQ-RTT-TimerSL-PSFCH or drx-HARQ-RTT-TimerSL-PUCCH or drx-RetransmissionTimerSL started for transmission of a MAC PDU:
2> if a drx-HARQ-RTT-TimerSL-PSFCH-PUCCH expires and NACK was transmitted on PUCCH for the transmission of the MAC PDU:
3> start the drx-RetransmissionTimerSL for the corresponding HARQ process ID or the corresponding value of sl-ConfigIndexCG in the first symbol after the expiry of the drx-HARQ-RTT-TimerSL-PSFCH-PUCCH.
2> if a drx-HARQ-RTT-TimerSL-PSFCH expires and NACK was received on PSFCH for the transmission of the MAC PDU and if no sidelink grant is available for retransmission of the MAC PDU and the maximum number of HARQ retransmissions of the MAC PDU has been not reached: (or a PDCCH previously indicated possibilty of retransmission grant for the MAC PDU)
3> start the drx-RetransmissionTimerSL for the corresponding HARQ process ID or the corresponding value of sl-ConfigIndexCG in the first symbol after the expiry of the drx-HARQ-RTT-TimerSL-PSFCH.
2> if a drx-HARQ-RTT-TimerSL-PUCCH expires and NACK was transmitted on PUCCH for the transmission of the MAC PDU:
3> start the drx-RetransmissionTimerSL for the corresponding HARQ process 1D or the corresponding value of sl-ConfigIndexCG in the first symbol after the expiry of the drx-HARQ-RTT-TimerSL-PUCCH.
2> if a drx-HARQ-RTT-TimerSL expires and if no sidelink grant is available for retransmission of the MAC PDU and the maximum number of HARQ retransmissions of the MAC PDU has been not reached: (or a PDCCH previously indicated possibility of retransmission grant for the MAC PDU)
3> start the drx-RetransmissionTimerSL for the corresponding HARQ process ID or the corresponding value of sl-ConfigIndexCG in the first symbol after the expiry of the drx-HARQ-RTT-TimerSL-PUCCH.
1> if a DRX Command MAC CE or a Long DRX Command MAC CE is received:
2> stop drx-onDurationTimer:
2> stop drx-InactivityTimer.
1> if drx-InactivityTimer expires or a DRX Command MAC CE is received:
2> if the Short DRX cycle is configured:
3> start or restart drx-ShortCycleTimer in the first symbol after the expiry of drx-InactivityTimer or in the first symbol after the end of DRX Command MAC CE reception;
3> use the Short DRX Cycle.
2> else:
3> use the Long DRX cycle.

1> if drx-ShortCycleTimer expires:
2> use the Long DRX cycle.
1> if a Long DRX Command MAC CE is received:
2> stop drx-ShortCycleTimer;
2> use the Long DRX cycle.
1> if the Short DRX Cycle is used, and [(SFN×10)+ subframe number] modulo (drx-ShortCycle)=(drx-StartOffset) modulo (drx-ShortCycle); or
1> if the Long DRX Cycle is used, and [(SFN×10)+ subframe number] modulo (drx-LongCycle)=drx-StartOffset:
2> start drx-onDurationTimer after drx-SlotOffset from the beginning of the subframe.
1> if the MAC entity is in Active Time:
2> monitor the PDCCH;
2> if the PDCCH indicates a DL transmission:
3> start the drx-HARQ-RTT-TimerDL for the corresponding HARQ process in the first symbol after the end of the corresponding transmission carrying the DL HARQ feedback;
3> stop the drx-RetransmissionTimerDL for the corresponding HARQ process.
2> if the PDCCH indicates a UL transmission:
3> start the drx-HARQ-RTT-Timer UL for the corresponding HARQ process in the first symbol after the end of the first repetition of the corresponding PUSCH transmission;
3> stop the drx-RetransmissionTimer UL for the corresponding HARQ process.
2> if the PDCCH or RRC indicates one or more SL transmissions and both sidelink HARQ feedback on PSFCH and sidelink HARQ feedback on PUCCH are enabled:
3> start the drx-HARQ-RTT-TimerSL-PSFCH-PUCCH for the corresponding HARQ process ID or the corresponding value of sl-ConfigIndexCG in the first symbol after the end of the corresponding PUCCH transmission carrying the SL HARQ feedback to the MAC PDU;
3> stop the drx-RetransmissionTimerSL for the corresponding HARQ process or the corresponding value of sl-ConfigIndexCG.
2> if the PDCCH or RRC indicates one or more SL transmissions and sidelink HARQ feedback on PSFCH is enabled but sidelink HARQ feedback on PUCCH are disabled:
3> start the drx-HARQ-RTT-TimerSL-PSFCH for the corresponding HARQ process ID or the corresponding value of sl-ConfigIndexCG in the first symbol after the end of the corresponding PSFCH reception carrying the SL HARQ feedback to the MAC PDU;
3> stop the drx-RetransmissionDimerSL for the corresponding HARQ process or the corresponding value of sl-ConfigIndexCG.
2> if the PDCCH or RRC indicates one or more SL transmissions and sidelink HARQ feedback on PSFCH is disabled but sidelink HARQ feedback on PUCCH are enabled:
3> start the drx-HARQ-RTT-TimerSL-PUCCH for the corresponding HARQ process ID or the corresponding value of sl-ConfigIndexCG in the first symbol after the end of the corresponding PUCCH transmission carrying the SL HARQ feedback to the MAC PDU;
3> stop the drx-RetransmissionTimerSL for the corresponding HARQ process or the corresponding value of sl-ConfigIndexCG.
2> if the PDCCH or RRC indicates one or more SL transmissions and both sidelink HARQ feedback on PSFCH and sidelink HARQ feedback on PUCCH are disabled:
3> start the drx-HARQ-RTT-TimerSL for the corresponding HARQ process ID or the corresponding value of sl-ConfigIndexCG in the first symbol after the end of the first repetition of the corresponding PSSCH transmission;
3> stop the drx-RetransmissionTimerSL for the corresponding HARQ process or the corresponding value of sl-ConfigIndexCG.
2> if the PDCCH indicates a new transmission (DL or UL or SL):
3> start or restart drx-InactivityTimer in the first symbol after the end of the PDCCH reception.
1> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
2> not transmit periodic SRS and semi-persistent SRS;
2> not report CSI on PUCCH and semi-persistent CSI configured on PUSCH.
1> if CSI masking (csi-Mask) is setup by upper layers:
2> in current symbol n, if drx-onDurationTimer would not be running considering grants/assignments/DRX Command MAC CE/Long DRX Command MAC CE received until 4 ms prior to symbol n when evaluating all DRX Active Time conditions as specified in this clause:
3> not report CSI on PUCCH.

Regardless of whether the MAC entity is monitoring PDCCH or not, the MAC entity transmits HARQ feedback (for UL or SL), aperiodic CSI on PUSCH, and aperiodic SRS when such is expected.

The MAC entity needs not to monitor the PDCCH if it is not a complete PDCCH occasion (e.g. the Active Time starts or ends in the middle of a PDCCH occasion).

Furthermore, the method in perspective of the first wireless device described above in FIG. 9 may be performed by the first wireless device 100 shown in FIG. 2, the wireless device 100 shown in FIG. 3, and/or the UE 100 shown in FIG. 4.

More specifically, the first wireless device comprises at least one transceiver, at least one processor, and at least one computer memory operably connectable to the at least one processor and storing instructions that, based on being executed by the at least one processor, perform operations below.

The first wireless device receives, from a base station via the at least one transceiver, a SL grant for a HARQ process ID.

The first wireless device assigns a sidelink process for the HARQ process ID based on the SL grant.

The first wireless device constructs a MAC PDU.

The first wireless device transmits, to a second wireless device via the at least one transceiver, the MAC PDU.

In some implementation, the MAC PDU may be transmitted in a configured sidelink grant.

The first wireless device receives, from the second wireless device via the at least one transceiver, a sidelink HARQ feedback for the MAC PDU on a PSFCH.

In some implementations, the sidelink HARQ feedback may correspond to a NACK for the MAC PDU.

The first wireless device starts a DRX HARQ RTT timer for the HARQ process ID after end of reception of the sidelink HARQ feedback for the MAC PDU.

In some implementations, the DRX HARQ RTT timer may inform a minimum duration before the SL retransmission grant is expected by an MAC entity for a SL transmission with the reception of the sidelink HARQ feedback on the PSFCH.

The first wireless devices starts a DRX retransmission timer upon expiry of the DRX HARQ RTT timer.

In some implementations, the DRX retransmission timer may inform a maximum duration until the SL retransmission grant is received.

In some implementations, the DRX retransmission timer may start based on no sidelink grant being available for retransmission of the MAC PDU and the maximum number of HARQ retransmissions of the MAC PDU not being reached.

The first wireless device monitors a PDCCH carrying a SL retransmission grant during an active time including a time interval for which the DRX retransmission timer is running.

In some implementations, the first wireless device may perform retransmission of the MAC PDU based on the SL retransmission grant.

In some implementations, a second sidelink HARQ feedback on a PUCCH to the base station may be enabled or disabled.

Furthermore, the method in perspective of the first wireless device described above in FIG. 9 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a wireless device operating in a wireless communication system (e.g., first wireless device) comprises at least one processor, and at least one computer memory operably connectable to the at least one processor. The at least one processor is configured to perform operations comprising: obtaining a SL grant for a HARQ process ID, assigning a sidelink process for the HARQ process ID based on the SL grant, constructing a MAC PDU, obtaining a sidelink HARQ feedback for the MAC PDU on a PSFCH, starting a DRX HARQ RTT timer for the HARQ process ID after end of reception of the sidelink HARQ feedback for the MAC PDU, starting a DRX retransmission timer upon expiry of the DRX HARQ RTT timer, and monitoring a PDCCH carrying a SL retransmission grant during an active time including a time interval for which the DRX retransmission timer is running.

Furthermore, the method in perspective of the first wireless device described above in FIG. 9 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: obtaining a SL grant for a HARQ process ID, assigning a sidelink process for the HARQ process ID based on the SL grant, constructing a MAC PDU, obtaining a sidelink HARQ feedback for the MAC PDU on a PSFCH, starting a DRX HARQ RTT timer for the HARQ process ID after end of reception of the sidelink HARQ feedback for the MAC PDU, starting a DRX retransmission timer upon expiry of the DRX HARQ RTT timer, and monitoring a PDCCH carrying a SL retransmission grant during an active time including a time interval for which the DRX retransmission timer is running.

Figure 10:
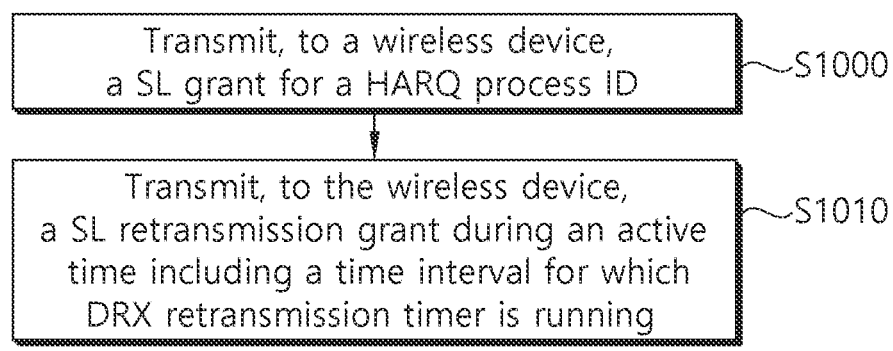
FIG. 10 shows an example of a method performed by a network node to which implementation 1 of the present disclosure is applied.

FIG. 10 shows an example of a method performed by a network node to which implementation 1 of the present disclosure is applied.

In step S1000, the network node transmits, to a wireless device, a SL grant for a HARQ process ID.

In step S1010, the network node transmits, to the wireless device, a SL retransmission grant during an active time including a time interval for which a DRX retransmission timer is running.

The DRX retransmission timer starts upon expiry of a DRX HARQ RTT timer for the HARQ process ID. The DRX HARQ RTT timer for the HARQ process ID starts after end of reception, by the wireless device, of sidelink HARQ feedback for transmission of a MAC PDU.

In some implementations, the DRX HARQ RTT timer may inform a minimum duration before the SL retransmission grant is expected by an MAC entity for a SL transmission with the reception of the sidelink HARQ feedback on the PSFCH.

In some implementations, the DRX retransmission timer may inform a maximum duration until the SL retransmission grant is received.

In some implementations, a second sidelink HARQ feedback on a PUCCH to the network node may be enabled or disabled.

In some implementations, the sidelink HARQ feedback may correspond to a NACK for the MAC PDU.

In some implementations, the DRX retransmission timer may start based on no sidelink grant being available for retransmission of the MAC PDU and the maximum number of HARQ retransmissions of the MAC PDU not being reached.

In some implementations, the MAC PDU may be transmitted by the wireless device in a configured sidelink grant.

Furthermore, the method in perspective of the network node described above in FIG. 10 may be performed by the second wireless device 200 shown in FIG. 2 and/or the wireless device 200 shown in FIG. 3.

More specifically, the network node comprises at least one transceiver, at least one processor, and at least one computer memory operably connectable to the at least one processor and storing instructions that, based on being executed by the at least one processor, perform operations below.

The network node transmits, to a wireless device via the at least one transceiver, a SL grant for a HARQ process ID.

The network node transmits, to the wireless device via the at least one transceiver, a SL retransmission grant during an active time including a time interval for which a DRX retransmission timer is running.

The DRX retransmission timer starts upon expiry of a DRX HARQ RTT timer for the HARQ process ID. The DRX HARQ RTT timer for the HARQ process ID starts after end of reception, by the wireless device, of sidelink HARQ feedback for transmission of a MAC PDU.

In some implementations, the DRX HARQ RTT timer may inform a minimum duration before the SL retransmission grant is expected by an MAC entity for a SL transmission with the reception of the sidelink HARQ feedback on the PSFCH.

In some implementations, the DRX retransmission timer may inform a maximum duration until the SL retransmission grant is received.

In some implementations, a second sidelink HARQ feedback on a PUCCH to the network node may be enabled or disabled.

In some implementations, the sidelink HARQ feedback may correspond to a NACK for the MAC PDU.

In some implementations, the DRX retransmission timer may start based on no sidelink grant being available for retransmission of the MAC PDU and the maximum number of HARQ retransmissions of the MAC PDU not being reached.

In some implementations, the MAC PDU may be transmitted by the wireless device in a configured sidelink grant.

According to implementation 1 of the present disclosure, the start point of the active time for PDCCH monitoring carrying SL grant can be optimized.

According to implementation 1 of the present disclosure, ambiguity can be eliminated because active time is defined based on PSFCH reception regardless of the presence of PUCCH resources.

Implementation 2

When multiple configured grants are configured, some of them can be overlapped. Or, a configured grant can be overlapped with other type of transmission. In this case, how to solve such collision is not clear.

FIG. 11 shows an example of sidelink transmission using sidelink configured grants to which implementation 2 of the present disclosure is applied.

In step S1100, the RX UE establishes a PC5-S unicast link and the associated PC5-RRC connection with TX UE. TX UE may transmit a PC5-RRC Reconfiguration.

In step S1102, the TX UE sends Sidelink UE information indicating the destination ID of the TX UE to the network.

In step S1104, the TX UE acquires/allocates a set of resources. The TX UE may be configured with one or more configured grants (CGs) by the network.

For example, if the TX UE is in RRC_CONNECTED and configured for gNB scheduled sidelink resource allocation (e.g., Mode 1), the TX may be configured with one or more configured grants by the network, e.g., by receiving DCI in PDCCH. The DCI may include an allocated sidelink resource. The TX UE may use the sidelink grant for transmission to the RX UE. If the TX UE is configured for UE autonomous scheduling of sidelink resource allocation (e.g., Mode 2) regardless of RRC state, the TX UE may autonomously select or reselect sidelink resources from a resource pool to create a sidelink grant used for transmission to the RX UE.

For example, the configured grant may be used for either uplink or sidelink transmission.

For example, the configured grant may consist of periodic transmission occasions. Each periodic transmission occasion may comprise one new transmission resource and up to two retransmission resources.

For example, the one or more of the configured grants may be mapped to logical channels and/or a MAC CE of the destination ID. The MAC CE may carry Sidelink CSI reporting.

For example, a set of PSCCH/PSSCH resources may periodically occur for each configured grant. The TX UE can perform sidelink transmission(s) by using the set of PSCCH/PSSCH resources for each period of the configured grant.

It is assumed in FIG. 11 that a configured grant having CG index A is configured. More specifically, the set of PSCCH/PSSCH resources may consist of three PSCCH/PSSCH resources for each period of the configured grant identified by CG index A. The TX UE may perform one transmission of a TB by using one PSCCH/PSSCH resource. For each period, only one TB can be transmitted in each period. Thus, if three PSCCH/PSSCH resources are allocated for a period, the first PSCCH/PSSCH resource may be used for new transmission of a TB and the second and third PSCCH/PSSCH resources may be used for retransmissions of the TB.

In some implementations, the TX UE may determine a priority of each configured grant.

For example, the network may indicate the priority of each configured grant.

For example, the TX UE may determine the priority of each configured grant by itself based on the highest priority of logical channels and/or a MAC CE carried in a MAC PDU over the configured grant.

For example, the TX UE may determine the priority of each configured grant by itself based on the priority of a destination which can be mapped to the configured grant.

In some implementations, the TX UE may determine a CG timer and/or CG retransmission timer for each configured grant according to one or more of the followings:

- the QoS characteristics such as the minimum packet delay budget (PDB) value of logical channels which can be mapped to the configured grant.
- the maximum number of HARQ retransmissions of the logical channels which can be mapped to the configured grant.
- PUCCH configuration (e.g., periodicity of PUCCH occasion and/or time gap between PSCCH/PSSCH resource and the associated PUCCH occasion) which may be associated with the configured grant
- PSFCH configuration (e.g., time gap between a PSCCH/PSSCH resource and the associated PSFCH resource) which may be associated with the configured grant Communication range between the TX UE and the RX UE The priority of the configured grant In some implementations, the TX UE may start and/or restart the CG timer and stop the CG retransmission timer for transmission(s) of the MAC PDU in the HARQ process for the configured grant when one or more of the following conditions is met:

when the TX UE performs new transmission;
when the TX UE receives a PDCCH addressed to a particular RNTI such as SLCS-RNTI which includes retransmission grant(s) for a configured grant;
when the TX UE performs retransmission grant(s) received from a PDCCH addressed to a particular RNTI such as SLCS-RNTI (Note that the timer may continue to run (without restarting) when retransmission grant(s) are pre-allocated by RRC or activation. i.e. not by a PDCCH addressed to SLCS-RNTI);
when the TX UE receives NACK on PSFCH from the RX UE
when the TX UE reports NACK to the transmission of the MAC PDU to the network
when a transmission of the MAC PDU with the configured grant is not performed because this transmission is deprioritized over the other overlapped transmission (i.e., this transmission is skipped due to the other transmission) or listen before talk (LBT) fails for this transmission.

In some implementations, the TX UE may stop the CG timer and/or the CG retransmission timer for transmission(s) of the MAC PDU in the HARQ process when one or more of the following conditions is met:

when the PDB of the MAC PDU cannot be met;
when the maximum number of retransmission of the MAC PDU is reached;
when the TX UE receives ACK on PSFCH from the RX UE;
when the UE receives no acknowledgement on PSFCH from any receiving UE (for groupcast transmission); or
when the TX UE reports ACK to the transmission of the MAC PDU to the network.

In step S1106, the TX UE receives activation of the configured grant having CG index A, which may be associated with HARQ process ID set to A1. Upon receiving the activation of the configured grant having CG index A, the TX UE may stop CG timer for HARQ process A1 of the configured grant (simply as CG timer A1) and/or CG retransmission timer for a HARQ process A1 of the configured grant (simply as CG retransmission timer A1).

In step S1108, the TX UE starts CG timer A1 and/or CG retransmission timer A1.

In step S1110, the TX UE performs new transmission and/or retransmission of a MAC PDU for a HARQ process associated with a HARQ process ID by using one configured grant, if activated.

For example, the TX UE may perform the first HARQ transmission of TB1 by using the first PSCCH/PSSCH resource of the first period of the configured grant having CG index A.

In step S1112, the TX UE receives SL HARQ ACK to the first HARQ transmission of TB1 on PSFCH.

In step S1114, based on receiving the SL HARQ ACK to the first HARQ transmission of TB1 on PSFCH, the TX UE continues to run the CG retransmission timer A1 of the CG and skips the second and third transmissions of TB1 by using second/third PSCCH/PSSCH resource of the first period.

For example, the TX UE may continue to run the CG retransmission timer A1 for any retransmission of the TB1 during the first period. While the CG timer A1 is running and the CG retransmission timer A1 is not running, the TX UE may perform HARQ retransmission of TB1 stored in HARQ process A1 and so cannot perform new HARQ transmission of a new TB.

In step S1116, the TX UE stops the CG timer A1 and the CG retransmission timer A1.

In step S118, when a PUCCH occasion occurs after transmission of TB1, the TX UE sends sidelink HARQ ACK on PUCCH to the network, and flushes the buffer of the HARQ process A1.

In some implementations, the TX UE may fail to transmit the CG timer A1 due to de-prioritization. For example, no PUCCH may be transmitted when PUCCH overlaps with any prioritized transmission. Even in this case, the TX UE may flush the buffer of the HARQ process A1, and stops CG timer A1 and CG retransmission timer A1.

In step S1120, since the CG timer A1 is not running and data is available for the configured grant, the TX UE creates a new MAC PDU (e.g., TB2) and performs a new HARQ transmission of TB2 for the second period of the configured grant having CG index A. The TX UE may continue to run the CG timer A1 until PUCCH transmission.

In step S1122, the TX UE receives sidelink HARQ NACK to the first HARQ transmission of TB2 on PSFCH.

In step S1124, the TX UE may perform retransmission (i.e., second HARQ transmission) of TB2 on the second resource of the second period of the configured grant. But, retransmission of TB2 on the second resource may be skipped, e.g., when it overlaps with a prioritized transmission.

In step S1126, if the TX UE receives sidelink HARQ NACK to the second HARQ transmission of TB2 on PSFCH, the TX UE performs a third HARQ transmission of TB2 on the third resource of the second period of the configured grant having CG index A.

In step S1128, the TX UE receives sidelink HARQ NACK to the third HARQ transmission of TB2 on PSFCH.

In step S1130, upon receiving sidelink HARQ NACK on PSFCH and/or no acknowledgement on PSFCH, the TX UE restarts CG retransmission timer A1.

For example, when the TX UE sends SL HARQ NACK on PUCCH to the network, when the end of the second period of the configured grant having CG index A is reached, and/or when transmission on the last resource is performed for the second period of the configured grant having CG index A, the TX UE may restart CG timer A1 and stops CG retransmission timer A1 for the configured grant.

For example, if PUCCH is not configured, the TX UE may continue to run the CG timer A1 until the end of the second period of the configured grant having CG index A and/or the maximum retransmission of TB2 is reached. The TX UE may stop the CG timer A1 w % ben the end of the second period of the configured grant having CG index A and/or the maximum retransmission of TB2 is reached.

In step S1132, upon receiving the TX UE receives sidelink HARQ NACK to the third HARQ transmission of TB2 on PSFCH and if no retransmission resource is available for TB2, the TX UE sends SL HARQ NACK on PUCCH to the network.

Or, if the TX UE receives no sidelink HARQ feedback to the third HARQ transmission of TB2 on PSFCH and no retransmission resource is available for TB2, the TX UE may send SL HARQ NACK on PUCCH to the network. Or, if PSFCH resource is not provided for the third HARQ transmission of TB2, maximum retransmission of TB2 has not been reached, and no retransmission resource is available for TB2, the TX UE may send SL HARQ NACK on PUCCH to the network.

In step S1134, the TX UE receives PDCCH including a retransmission grant for the configured grant having CG index A and HARQ process ID indicating HARQ process A1. The PDCCH may be addressed to SLCS-RNTI and indicate PUCCH resource allocation.

For example, upon receiving the PDCCH, the TX UE may restart the CG timer A1 and stops CG retransmission timer A1.

In step S1136, if the CG timer A1 is running and the CG retransmission timer A1 is not running, the TX UE performs retransmission (e.g., fourth HARQ transmission) of TB2 by using the received retransmission grant for the third period of the configured grant having CG index A.

For example, if the CG timer is running and/or if the buffer of the HARQ process is not empty or occupied for the associated HARQ process ID, the TX UE may stop the CG retransmission timer for the HARQ process and perform retransmission of the MAC PDU by using the retransmission grant.

In step S1138, the TX UE receives sidelink HARQ ACK to the retransmission of TB2 on PSFCH.

In step S1140, upon receiving the sidelink HARQ ACK to the retransmission of TB2 on PSFCH, the TX UE may stop retransmission of TB2 for the third period of the configured grant having CG index A. If retransmission grant is available, the TX UE may ignore the retransmission grant.

For example, if the CG timer expired and/or if the buffer of the HARQ process is empty or occupied for the other HARQ process ID, the TX UE may ignore the retransmission grant.

Or, if the TX UE receives sidelink HARQ NACK on PSFCH and another retransmission grant is available, the TX UE may perform retransmission of TB2 for the third period of the configured grant having CG index A.

In step S1142, the TX UE stops CG timer A1 and CG retransmission timer A1.

In step S1144, when a PUCCH occasion occurs according to PUCCH resource allocated by the PDCCH after transmission of TB2, the TX UE may send SL HARQ ACK on PUCCH to the network, and flush the buffer of the HARQ process A1. That is, if PUCCH resource is allocated by the PDCCH, the TX UE may send SL HARQ ACK on PUCCH to the network.

Or, the TX UE may fail to transmit sidelink HARQ ACK on PUCCH due to de-prioritization. For example, no PUCCH may be transmitted when PUCCH overlaps with any prioritized transmission. Even in this case, the TX UE may flush the buffer of the HARQ process A1, and stop CG timer A1 and CG retransmission timer A1.

According to implementation 2 of the present disclosure shown in FIG. 11, an example of operations of the MAC entity may be as follows.

The MAC entity shall for each PSSCH transmission:
1> if an acknowledgement corresponding to the PSSCH transmission is obtained from the physical layer:
2> deliver the acknowledgement to the corresponding Sidelink HARQ entity for the Sidelink process;
1> else:
2> deliver a negative acknowledgement to the corresponding Sidelink HARQ entity for the Sidelink process;

If sl-PUCCH-Config is configured by RRC, the MAC entity shall for each MAC PDU on the PSSCH transmission and for the PUCCH resource used for reporting an acknowledgement corresponding to the PSSCH transmission to NG-RAN:
1> if the PUCCH resource occasion overlaps with neither a UL-SCH resource nor a SL-SCH resource; or
1> if a SL-SCH resource overlaps with the PUCCH resource, and the MAC entity is not able to perform this PUCCH transmission simultaneously with the transmission of the SL-SCH resource, and either transmission on the SL-SCH resource is not prioritized or the value of the highest priority of the logical channel(s) and a MAC CE, if any, in the MAC PDU is lower than sl-Prioritizationthres, if configured, or the highest priority of the logical channel(s) and a MAC CE, if any, in the MAC PDU is higher than the highest priority of another MAC PDU to be transmitted on the SL-SCH resource; or
1> if a UL-SCH resource overlaps with the PUCCH resource, and the MAC entity is not able to perform this PUCCH transmission simultaneously with the transmission of the UL-SCH resource, and either transmission on the UL-SCH resource is not prioritized or the value of the highest priority of the logical channel(s) and a MAC CE, if any, in the MAC PDU is lower than sl-Prioritizationthres, if configured, or the highest priority of the logical channel(s) and a MAC CE, if any, in the MAC PDU is higher than the highest priority of another MAC PDU to be transmitted on the UL-SCH resource, or the value of the highest priority of the logical channel(s) and a MAC CE, if any, in the MAC PDU is higher than ul-Prioritizationthres, if configured:
2> if a positive acknowledgement has been received for the MAC PDU; or
2> if only a negative acknowledgement was enabled in the SCI and no negative acknowledgement was received for the the most recent (re-)transmission of the MAC PDU; or
2>[if sl-MaxTransNum corresponding to the highest priority of the logical channel(s) in the MAC PDU has been configured in sl-CG-MaxTransNumList for the sidelink grant by RRC and the maximum number of transmissions of the MAC PDU has been reached to sl-MaxTransNum]:
3> instruct the physical layer to signal a positive acknowledgement on the PUCCH.
3> stop the configuredGrantTimer and the cg-RetransmissionTimer, if running.
2> else if the PSSCH transmission was not prioritized:
3> instruct the physical layer to signal a negative acknowledgement on the PUCCH.
3> start or restart the configuredGrantTimer, if running.
3> stop the cg-RetransmissionTimer, if running.
2> else:
3> instruct the physical layer to signal an acknowledgement on the PUCCH.
3> stop the cg-RetransmissionTimer, if running.
3> start or restart the configuredGrantTimer, if running.

According to implementation 2 of the present disclosure, a UE performing HARQ transmissions of a configured grant can properly handle a timer for new transmission and/or retransmission of a configured grant, in particular when the UE performs new transmission or retransmission on the configured grant based on the timer.

According to implementation 2 of the present disclosure, the system can properly control new transmission or retransmission of a configured grant for a UE performing HARQ transmissions on the configured grant.

In the description above, for the sake of the convenience, sidelink transmission between two UEs is exemplarily described. The present disclosure is not limited thereto, so the present disclosure may be applied to uplink transmission between one UE and one base station. For example, sidelink configured grants describe above can be replaced by uplink configured grants. Or, one configured grant may be sidelink configured grant while the other configured grant may be uplink configured grant.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device, the method comprising:
   receiving, from a base station, a sidelink (SL) grant;
   associating a hybrid automatic repeat request (HARQ) process identifier (ID) corresponding to the SL grant to a sidelink process;
   constructing a media access control (MAC) protocol data unit (PDU);
   transmitting, to a second wireless device, the MAC PDU;
   receiving, from the second wireless device, a sidelink HARQ feedback corresponding to transmission of the MAC PDU, wherein the sidelink HARQ feedback is received on a physical sidelink feedback channel (PSFCH);
   starting a discontinuous (DRX) HARQ round trip time (RTT) SL timer for a corresponding HARQ process i) in a first symbol after an end of a physical uplink control channel (PUCCH) transmission carrying the sidelink HARQ feedback, or ii) at a first symbol after an end of a physical sidelink shared channel (PSSCH) transmission on which the MAC PDU is transmitted, based on whether a PUCCH resource is configured or not,
   wherein the DRX HARQ RTT SL timer informs a minimum duration before a SL retransmission grant is expected by a MAC entity;
   starting a DRX retransmission SL timer for the corresponding HARQ process based on i) expiry of the DRX HARQ RTT SL timer, and ii) a negative acknowledgement (NACK) as the sidelink HARQ feedback being transmitted on a PUCCH,
   wherein the DRX retransmission SL timer informs a maximum duration until the SL retransmission grant is received; and
   monitoring a physical downlink control channel (PDCCH) carrying the SL retransmission grant during an active time which includes time while the DRX retransmission SL timer is running.

2. The method of claim 1, wherein the sidelink HARQ feedback is associated to the corresponding HARQ process.

3. The method of claim 1, wherein the DRX retransmission SL timer starts based on no sidelink grant being available for retransmission of the MAC PDU and the maximum number of HARQ retransmissions of the MAC PDU not being reached.

4. The method of claim 1, wherein the MAC PDU is transmitted in the SL grant.

5. The method of claim 1, further comprising performing retransmission of the MAC PDU based on the SL retransmission grant.

6. The method of claim 1, wherein the first wireless device is in communication with at least one of a mobile device, a network, and/or autonomous vehicles other than the first wireless device.

7. A first wireless device configured to operate in a wireless communication system, the first wireless device comprising:
   at least one transceiver;
   at least one processor; and
   at least one memory operably connectable to the at least one processor and storing instructions that, based on being executed by the at least one processor, perform operations comprising:
   receiving, from a base station via the at least one transceiver, a sidelink (SL) grant;
   associating a hybrid automatic repeat request (HARQ) process identifier (ID) corresponding to the SL grant to a sidelink process;
   constructing a media access control (MAC) protocol data unit (PDU);
   transmitting, to a second wireless device via the at least one transceiver, the MAC PDU;
   receiving, from the second wireless device via the at least one transceiver, a sidelink HARQ feedback corresponding to transmission of the MAC PDU, wherein the sidelink HARQ feedback is received on a physical sidelink feedback channel (PSFCH);
   starting a discontinuous (DRX) HARQ round trip time (RTT) SL timer for a corresponding HARQ process i) in a first symbol after an end of a physical uplink control channel (PUCCH) transmission carrying the sidelink HARQ feedback, or ii) at a first symbol after an end of a physical sidelink shared channel (PSSCH) transmission on which the MAC PDU is transmitted, based on whether a PUCCH resource is configured or not,
   wherein the DRX HARQ RTT SL timer informs a minimum duration before a SL retransmission grant is expected by a MAC entity;
   starting a DRX retransmission SL timer for the HARQ process ID based on i) expiry of the DRX HARQ RTT SL timer, and ii) a negative acknowledgement (NACK) as the sidelink HARQ feedback being transmitted on a PUCCH,
   wherein the DRX retransmission SL timer informs a maximum duration until the SL retransmission grant is received; and
   monitoring a physical downlink control channel (PDCCH) carrying the SL retransmission grant during an active time which includes time while the DRX retransmission SL timer is running.

8. The first wireless device of claim 7, wherein the sidelink HARQ feedback is associated to the corresponding HARQ process.

9. A processing apparatus configured to control a wireless device in a wireless communication system, the processing apparatus comprising:
   at least one processor; and
   at least one memory operably connectable to the at least one processor and storing instructions that, based on being executed by the at least one processor, perform operations comprising:

obtaining a sidelink (SL) grant;

associating a hybrid automatic repeat request (HARQ) process identifier (ID) corresponding to the SL grant to a sidelink process;

constructing a media access control (MAC) protocol data unit (PDU);

obtaining a sidelink HARQ feedback corresponding to the MAC PDU;

starting a discontinuous (DRX) HARQ round trip time (RTT) SL timer for a corresponding HARQ process i) in a first symbol after an end of a physical uplink control channel (PUCCH) transmission carrying the sidelink HARQ feedback, or ii) at a first symbol after an end of a physical sidelink shared channel (PSSCH) transmission on which the MAC PDU is transmitted, based on whether a PUCCH resource is configured or not, wherein the DRX HARQ RTT SL timer informs a minimum duration before a SL retransmission grant is expected by a MAC entity;

starting a DRX retransmission SL timer for the HARQ process ID based on i) expiry of the DRX HARQ RTT SL timer, and ii) a negative acknowledgement (NACK) as the sidelink HARQ feedback being transmitted on a PUCCH, wherein the DRX retransmission SL timer informs a maximum duration until the SL retransmission grant is received; and monitoring a physical downlink control channel (PDCCH) carrying the SL retransmission grant during an active time which includes time while the DRX retransmission SL timer is running.

* * * * *